United States Patent [19]

Clarke et al.

[11] 4,161,420
[45] Jul. 17, 1979

[54] ULTRASONIC METHOD FOR MANUFACTURING BRASSIERE TAPES

[75] Inventors: Robert A. Clarke, White Plains; Peter J. Kuhl, Jackson Heights; Richard H. Paschke, Medford, all of N.Y.

[73] Assignee: Cavitron Corporation, New York, N.Y.

[21] Appl. No.: 806,427

[22] Filed: Jun. 14, 1977

Related U.S. Application Data

[62] Division of Ser. No. 736,786, Oct. 29, 1976, Pat. No. 4,045,271.

[51] Int. Cl.$^2$ .................... A41F 1/00; B29C 27/08
[52] U.S. Cl. .................... 156/73.3; 24/73 LF; 24/201 HE; 24/203 R; 112/407; 156/88; 156/251; 156/289
[58] Field of Search .................... 156/73.1, 73.3, 88, 156/250, 251, 289, 510, 515, 580.1, 580.2; 2/266; 24/73 LF, 201 C, 201 HE, 203 R; 112/407

[56] References Cited

U.S. PATENT DOCUMENTS

| | | | |
|---|---|---|---|
| 2,364,870 | 12/1944 | Otto | 156/289 |
| 2,440,664 | 4/1948 | Irons | 156/289 |
| 2,728,439 | 12/1955 | Murphy et al. | 400/241.1 |
| 2,861,276 | 11/1958 | Alfandre | 112/407 |
| 2,898,257 | 8/1959 | Carver | 156/289 |
| 3,530,813 | 9/1970 | Roseman | 112/407 |
| 3,776,804 | 12/1973 | Monahan et al. | 156/515 |
| 3,817,802 | 6/1974 | Meyer | 156/73.3 |
| 3,859,150 | 1/1975 | Van Amberg | 156/73.1 X |
| 3,874,975 | 4/1975 | Lagain | 156/515 |
| 4,025,374 | 5/1977 | Spindler et al. | 156/251 X |

*Primary Examiner*—Michael G. Wityshyn
*Attorney, Agent, or Firm*—William R. Evans; Robert M. Skolnik

[57] ABSTRACT

Brassiere tapes having a body portion and a pair of overlapping tabs extending outwardly therefrom are manufactured by providing a continuous strip of the tape material having elements spaced there along and layers at least in the body portion-forming part thereof. The material is weldable with ultrasonic vibratory energy, and the tabs are separated physically from each other while simultaneously maintained in acoustical energy coupling relation to each other, such that the individual layers of material in the strip are welded together across the body portion of a tape defined thereby and the tabs are individually welded along an edge but not welded together when interposed between an ultrasonically vibrating horn and an anvil. The strip is advanced on an intermittent basis between the horn and the anvil by the elements for continuously producing tapes having a desired number of elements thereon. The separating of the tabs is obtained by interposing an insulation element of material characterized in that it does not bond to the material under ultrasonic vibration but simultaneously permits the vibratory energy to be transmitted therethrough.

25 Claims, 12 Drawing Figures

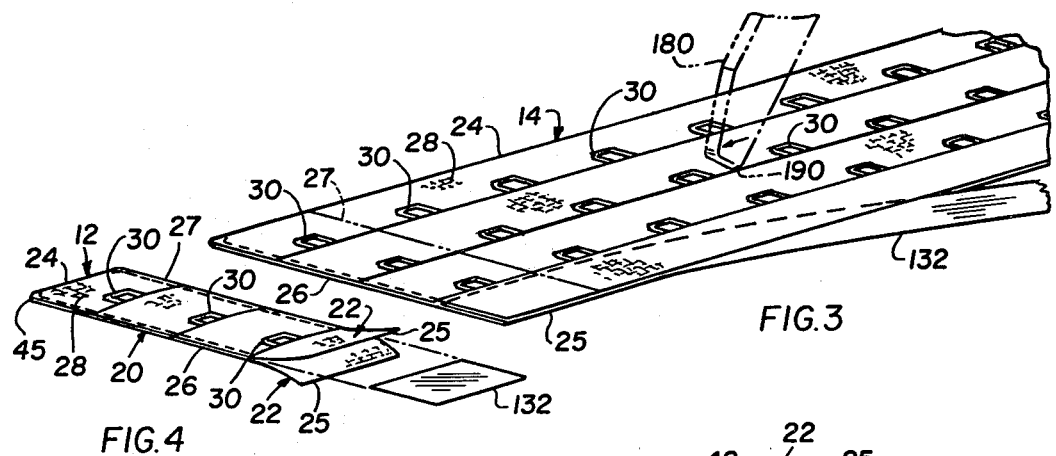
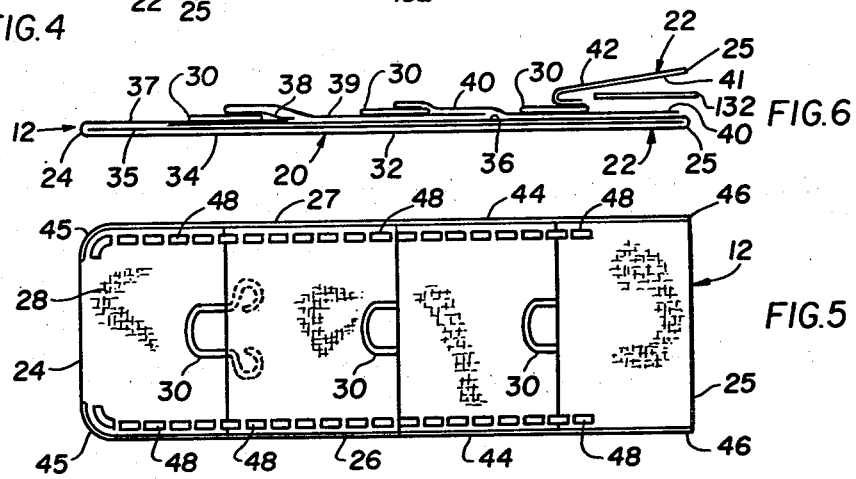
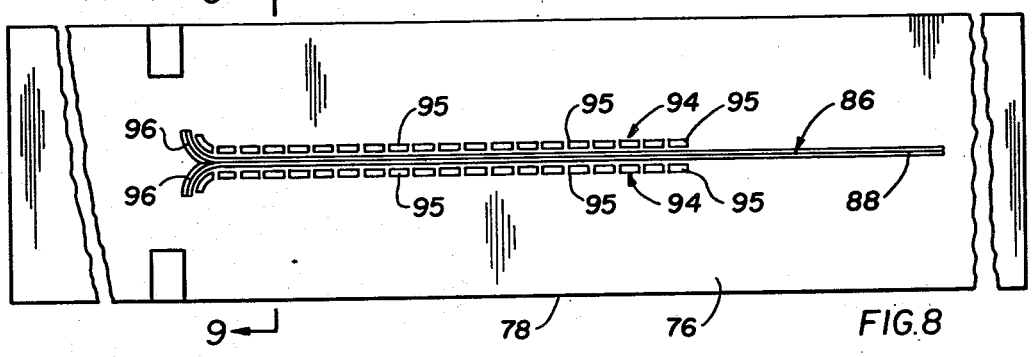
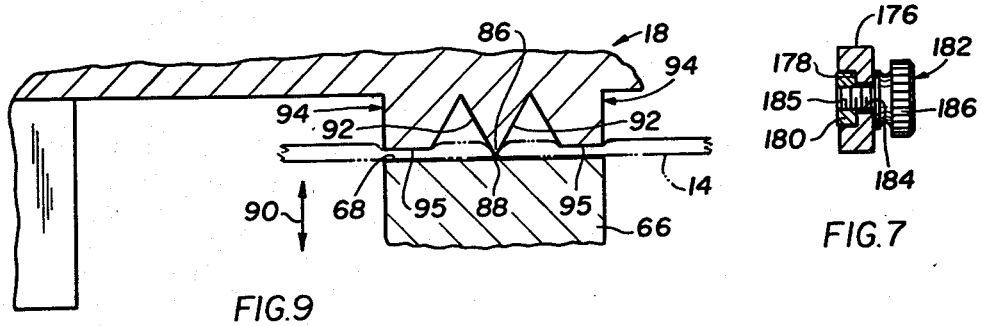

ULTRASONIC METHOD FOR MANUFACTURING BRASSIERE TAPES

This is a division of application Ser. No. 736,786, filed Oct. 29, 1976, now U.S. Pat. No. 4,045,271.

BACKGROUND OF THE INVENTION

The present invention relates generally to the manufacture of articles from an elongated continuous strip, and more particularly concerns an improved method for producing closure tapes for brassieres.

Prior to the present invention considerable time and effort had to be expended to produce the individual tapes that are joined to the rear portion of a brassiere. In this type of wearing apparel, or undergarment, one tape having hooks thereon and another tape having eyes thereon are attached to opposite sides of the brassiere for adjustable coupling in a manner well known. In order to manufacture these tapes previously, they were cut from a layered continuous strip, and then sewn with hand control in order to join together separately the layers of material for the overlapping end tabs of the tape.

Applicants have now discovered that it is possible to utilize ultrasonic vibratory energy to form these tapes. The flexible layers of material from which the tapes are formed are generally woven with sufficient synthetic composition, generally at least thirty percent, to be capable of welding with ultrasonic energy.

Conventional ultrasonic welding techniques in which the strip of tape material was interposed between an ultrasonic horn and anvil would weld together the individual layers, but also the overlapping pair of tabs. This would be unacceptable in that the tabs are subsequently utilized to straddle a portion of the garment to which they are joined.

While the instant invention will be primarily described in conjunction with the manufacture of brassiere tapes, it will be apparent that the same principles disclosed herein may be applied to the manufacture of other articles formed from a continuous strip having layers of fabric, or material, and in which a pair of overlapping tabs or other protrusions are to extend therefrom.

OBJECTS OF THE INVENTION

An object of the present invention is to provide novel methods for the continual forming of brassiere tapes or the like.

Another object of the present invention is to provide novel methods for the continual forming from an elongated strip of material tapes in which selective portions thereof are simultaneously welded and cut from the elongated strip.

Another object of the present invention is to provide an improved method for feeding an elongated strip into a work station having an ultrasonic horn and anvil for sealing and cutting the strip on a continual operating basis at suitable speeds for manufacturing of products therefrom.

Other objects and advantages of the present invention will become apparent as the disclosure proceeds.

SUMMARY OF THE INVENTION

The outstanding and unexpected results obtained by the practice of the method of this invention are obtained by a series of features, steps and elements assembled and working together in interrelated combination. The novel method eliminates a sewing operation on each tape and the savings in the attendant material handling costs that would be normally incurred.

The brassiere tape of the present invention comprises a body portion having various overlapping layers of material with a synthetic composition sufficient to permit ultrasonic welding thereof. The body portion has a forward edge, a rear edge in substantially parallel spaced relationship to the forward edge and spaced apart ends extending between the edges with a pair of tabs extending outwardly from one thereof. At least one row of elements in the form of hooks or eyes is secured to the body portion along a plane parallel to the ends, and the layers of material in the body portion are welded to each other, whereby the tabs are adapted to receive therebetween the portion of the brassiere to which they are to be secured. A plurality of longitudinally aligned spaced apart spot welds adjacent each edge of the body portion may be also provided.

The brassiere tapes are ultrasonically produced from an elongated continuous strip of material formed of flexible layers having a plurality of spatially separated elements in the form of hooks or eyes extending above the strip between its edges. In view of the fact that each tape had to have an equal number of hooks or eyes thereon, and the elements were not always equally spaced along the strip, feeding of the strip on an intermittent basis was also a problem that had to be solved by the present invention, as hereinafter discussed.

An ultrasonically vibrating horn with a forward end for engaging one side of the strip, and an anvil having a surface opposing the forward end and engaging the opposite side of the strip is used. The horn and the anvil simultaneously sever and weld the strip transversely between the ends when brought into operative relationship with each other.

To provide the simultaneous cutting and welding operation, the anvil surface may comprise a first surface formed with a knife edge extending transversely to the path of travel of the strip for compressing and welding the material interposed between the first surface and the horn along a comparatively narrow path responsive to the ultrasonic energy applied to the horn. The knife edge also cuts through the tabs and an insulation element extending therebetween. A second surface formed adjacent each side of the first surface simultaneously forms a plurality of embossed welds between the layers of strip material on the trailing or rear edge of one cut-off tape and the leading or forward edge of the next tape.

The insulation element is interposed between the tabs and transmits therethrough ultrasonic vibratory energy to permit individual layers of material in each of the tabs to be simultaneously welded together as the tabs and tape bodies are severed.

The anvil and horn reciprocate between an open, spaced apart position for advancing the strip therebetween and an operative position engaging the strip on opposite sides thereof as the horn is ultrasonically vibrated to sever and weld the layers of the strip across the width thereof to form the rear or trailing edge of one tape and the forward or leading edge of the next tape.

A distinct advantage of the second surface on the anvil is the ability to vary the pattern thereof which appears on each individual tape. The selected pattern is an additional factor in the market acceptance of the end product. One second surface pattern looks like "stitching", yet the bond formed is stronger than the threads of a sewing operation. Further, by simultaneously performing the welding and cutting operation, in accordance with the present invention, certain labor and materials handling expenses, in addition to the cost of the thread, have also been eliminated.

The useful life of the end product has also been prolonged by the use of the present invention. It has been found that after a number of washings of a barssiere that is manufactured by conventional assembly procedures, the threads normally utilized on the tapes tend to break. The present invention eliminates this problem since no thread is utilized in the manufacturing process. Accordingly, another advantage of the present invention is to improve the useful life of the end product by eliminating thread breakage, and puckering and abrasions to the wearer from broken thread. Automation of the process of manufacturing tapes also provides increased quality of the end product since it is uniformly produced mechanically, thereby eliminating variations encountered in hand produced tapes.

Because the spacing between the elements along the strip of material was not equidistant a new and novel means for indexing or feeding of the strip relative to the working station consisting of the horn and anvil had to be invented for automating the manufacturing process. The strip is fed from a roll and the tolerance buildup in element spacing after forming a number of tapes could result in the horn and anvil engaging an element rather than the space therebetween. Accordingly, applicants have devised a novel feeding means for intermittently advancing the leading end of the strip a predetermined distance by means of the elements. A feeding device engages an element and moves from a retracted position to an extended position in timed relationship to the reciprocating horn and anvil and then retracts for contacting another of the spatially separated elements.

The feeding device may comprise a finger pivotally movable into contact with one of the elements on the strip when advancing same, and over the elements when moved from the extended position to the retracted position. The finger can be biased into contact with the element when advancing the strip.

An automatic electrical control system is also provided to perform the necessary sequencing of all the operations performed on the strip.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 3 is a perspective diagrammatic view of the elongated tape and the insulator element positioned relative to the tabs;

FIG. 4 is a perspective view of a brassiere tape formed from the elongated strip;

FIG. 5 is a top plan view of an article manufactured by the equipment illustrated in FIG. 1 in the form of a brassiere tape;

FIG. 6 is a side view illustrating the respective layers of material forming the strip;

FIG. 7 is a sectional view taken along lines 7—7 of FIG. 2;

FIG. 8 is a bottom plan view of the anvil having thereon the knife edge and elements for forming the embossed welds;

FIG. 9 is a sectional view taken along lines 9—9 of FIG. 8;

DETAILED DESCRIPTION OF PREFERRED EMBODIMENTS SHOWN IN THE DRAWINGS

Figure 1:
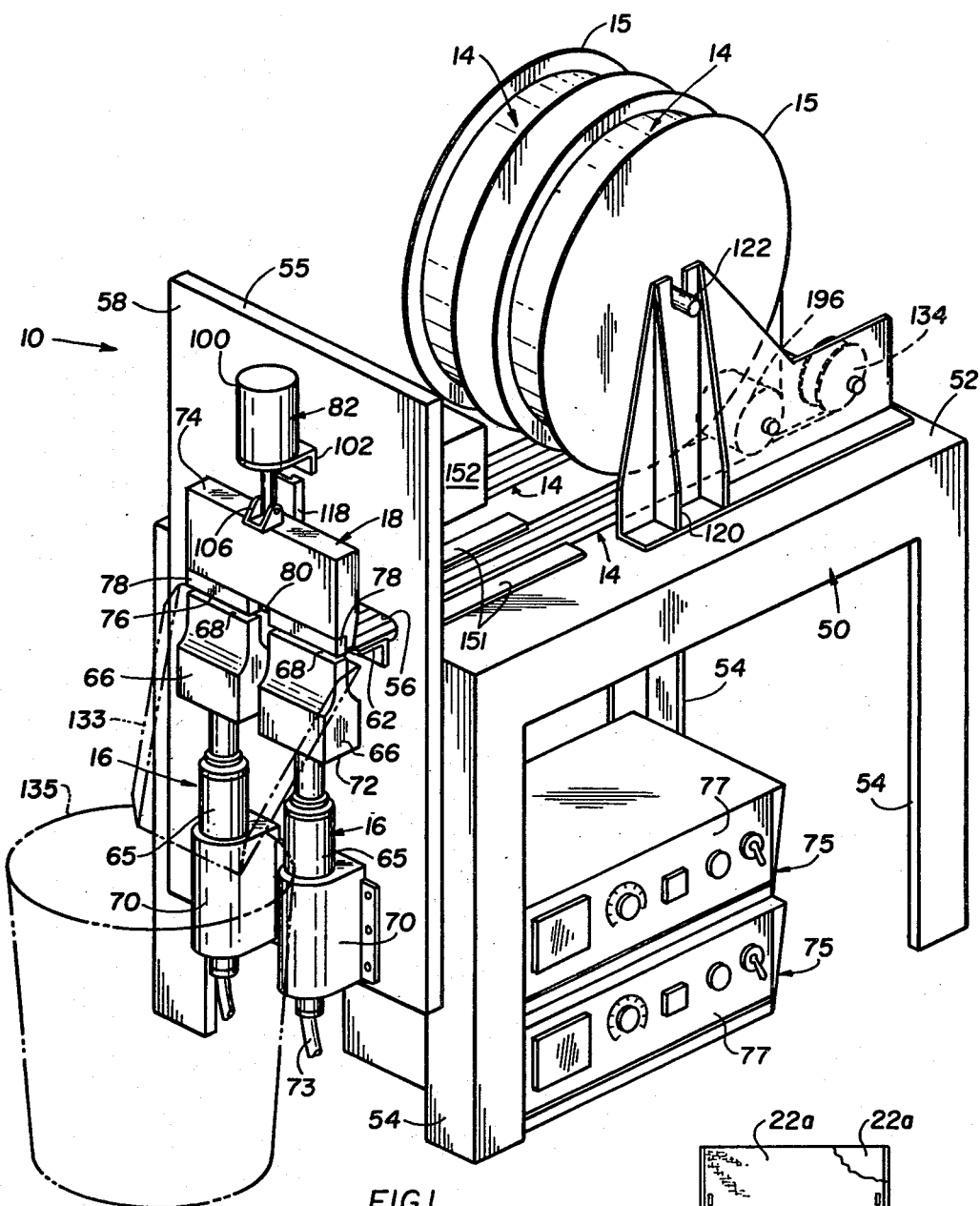
FIG. 1 is a front perspective view of a preferred embodiment of the present invention.
Figure 2:
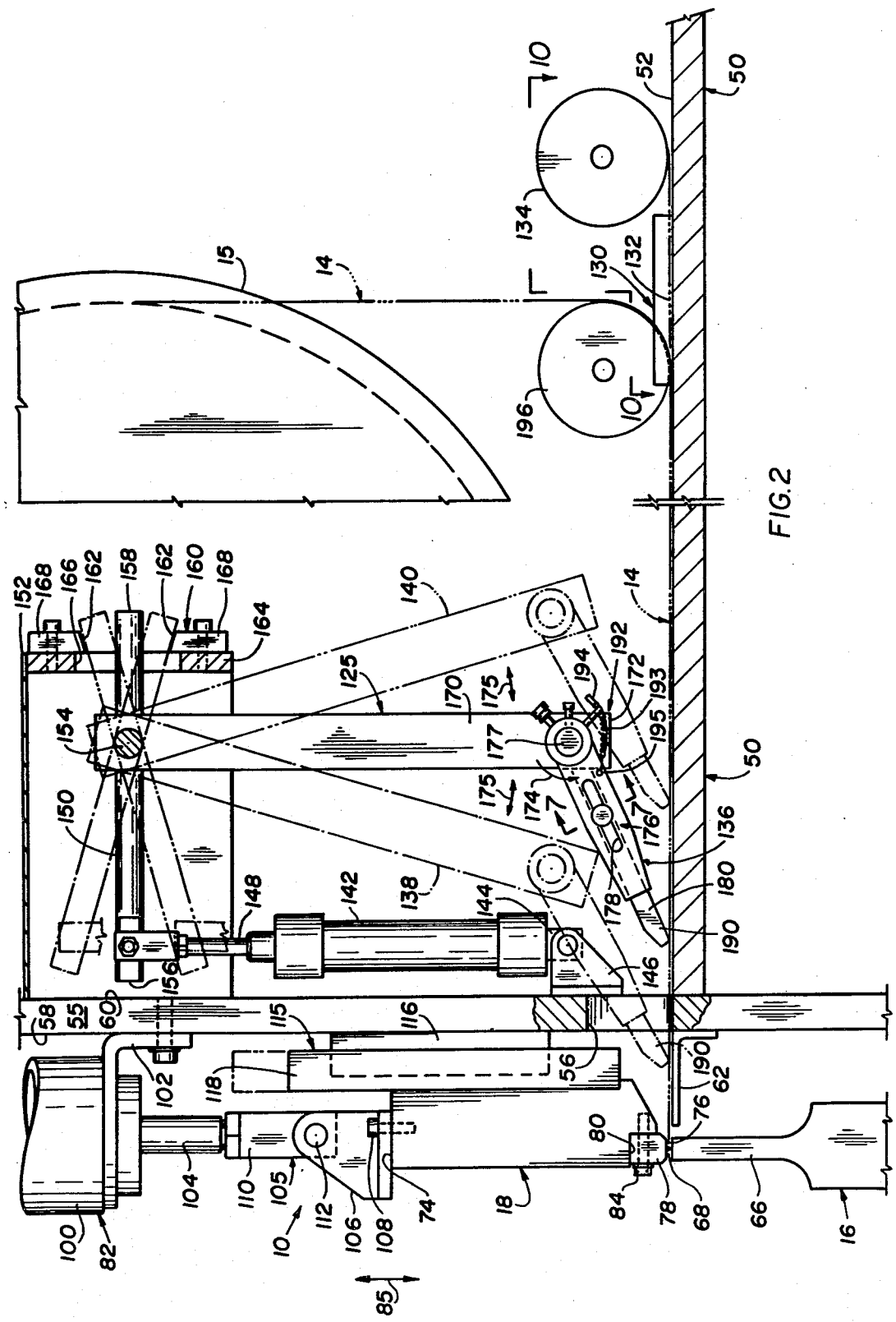
FIG. 2 is a partial side view illustrating the equipment of FIG. 1.

Referring to the drawings, and initially to FIG. 1 and 2 thereof, there is illustrated a preferred embodiment of the apparatus 10 for manufacturing individual articles or tapes 12 from a continuous elongated strip 14 on a roll 15. The apparatus includes interrelated ultrasonic welding means 16 and cooperating anvil means 18 which produce the individual tapes 12.

To more fully appreciate the various points of novelty of the present invention, an initial discussion of the continuous strip 14 and the configuration of the tape 12 for a brassiere is helpful. The strip 14, when formed into tape 12, as illustrated in FIGS. 3 through 6, includes a body portion 20 and a pair of tabs or flaps 22 extending outwardly from the body portion 20 to define one end 24 of the tape on the body portion and an opposite end 25 on each of the respective tabs 22. The ends 24 and 25 extend in substantially parallel spaced relationship to each other. Forming the tape 12 also defines a pair of spaced apart edges 26 and 27. The strip end which forms edge 26 is sometimes referred to as the forward or leading end of the strip 14 or tape 12 and the edge 27 is sometimes referred to as the trailing or rear end. Mounted on the upper surface 28 of the strip 14 are a plurality of spaced apart rows of fastening elements 30.

These rows of elements extend in a plane parallel to the ends 26 and 27. The elements 30 may take various forms and shapes and generally include an eye, as illustrated in FIGS. 4 and 5, or a hook. As particularly illustrated in FIG. 6, the individual tape 12 is comprised of flexible layers of material which may be woven as a fabric or of synthetic sheet material. If the individual layers of material are woven, they have a sufficient synthetic content, generally at least thirty percent, in order to be ultrasonically weldable. The spatially separated elements 30 extend above the upper surface 28 such that the strip 14 may be advanced on the lower surface 32 thereof.

To form the layered tape, the strip 14 has overlapping sheets 34, 35, 36, 37, 38, 39, 40, 41 and 42. In certain areas of the strip 14 between the strip edges defining tape ends 24 and 25 there may be two individual layers of fabric in overlapping relationship to each other or there may be more. Various of the layers of sheets 34 through 42, inclusive, are obtained by folds. When the strip 14 is processed between the ultrasonic welding means 16 and anvil means 18, a particular width is severed and simultaneously there is formed a welded or bonded seam 44 adjacent each edge 26 and 27 of each individual tape. The seam or weld 44 has an end 45 that is contoured to extend onto the end 24 but terminates at an opposite end 46 at the other tape end 25.

Accordingly, an important feature of the present invention is that the weld extends across each of the tabs 22 such that the overlapping layers of material are welded all along each edge 26 and 27 of the tape 12. For both strength and aesthetic reasons, a plurality of longitudinally aligned spaced apart spot welds are provided adjacent each seam 44. Having produced a tape 12 with these characteristics, the tape 12 may thereafter be utilized by securing the respective tabs 22 which have not been welded together in a manner hereinafter described in greater detail onto the brassiere.

Returning to FIGS. 1 and 2, a frame 50 has a supporting surface 52 on which the strip 14 will be intermittently advanced. The frame 50 may include a plurality of vertically extending legs 54 for supporting the surface 52. A support or mounting plate 55 extends vertically from one end of the frame 50 with an opening 56 extending therethrough to permit the passage of the continuous strip 14. The mounting plate 55 has a front 58 and rear surface 60.

A bracket 70 mounts the ultrasonic welding means 16 vertically on the mounting plate 55. The apparatus 10 is capable of producing the tapes 12 from either a single strip roll 15 or a dual roll mounted in side by side relationship with each other. Obviously, several rolls 15 may be mounted on a common axis and processed through the maching simultaneously.

The ultrasonic welding means 16 is comprised of an ultrasonic motor or transducer 65, well known in the art, that has coupled thereto an ultrasonic horn or tool 66 having a forward end 68 that extends in a plane substantially parallel with the supporting surface 52 and a support extension 62 on the other side of the mounting plate 55. The horn 66 has its output end 68 in position to engage the lower surface 32 of the strip 14 when it is advanced intermittently with respect thereto. The horn 66 may be in the form of an acoustical impedance transformer designed to increase the amplitude of vibration between its rear end 72 and the forward end 68. A cable 73 connects each motor 65 to a converter or generator unit 75 which has associated therewith various controls on the front panel 77.

The operating frequency of the motor 65 is determined by the relationship with the generator unit 75 which receives 60 Hz line voltage and delivers high frequency power, typically in the range of 20 kHz to 40 kHz. The term "ultrasonic" as herin used is to cover the frequency range of 5 kHz to 1,000 kHz. As is well known, the motor 65 converts the electrical energy applied thereto to mechanical vibrations by use of piezoelectric or magnetostrictive elements.

The anvil means 18 is mounted in cooperating relationship with the ultrasonic welding means 16 for engaging the opposite or upper side 28 of the strip 14. The anvil 18 and horn 66 are adapted to simultaneously sever the strip 14 transversely between the edges 24 and 25 and form the welds 44 adjacent each of the edges 26 and 27. The anvil 18 has a top end 74 and bottom end 76 that becomes part of the working surface, as illustrated in FIGS. 8 and 9 and hereinafter discussed.

The anvil 18 may extend transversely across the width of two horns 66 and have removable plates 78 secured by fasteners 84 (FIG. 2) and abutting the bottom end 80 thereof. The removable plates 78 are replaced from time to time if the configuration of the welds 48 is to be modified, or due to dulling of a knife edge associated with the anvil plates 78.

Reciprocating means 82 moves the anvil 18 between an open position, in which the anvil means 18 and horn 66 are vertically spaced apart for receiving the strip 14 therebetween, to an operative or closed position, as illustrated in FIGS. 1 and 2, in which the surface 76 of the anvil means 18 and the forward end 68 of the horn are moved together for engaging the strip 14 on opposite sides thereof. The reciprocating means is cycled to maintain the operative position for a selected period of time in order to perform the necessary cutting and welding operations.

It is fully appreciated that although in the preferred embodiment the anvil 18 is mounted for reciprocal motion, as illustrated by double headed arrow 85, that it is also possible to reciprocate the ultrasonic motors 65. Furthermore, the plate 78 may form the forward portion of a horn, rather than form part of the anvil means 18. The horn 66 is longitudinally vibrated to apply the vibratory forces in a plane substantially perpendicular to the bottom end 76 of each anvil plate 78. Other means of providing this vibratory motion are within the scope of the present invention.

The individual removable plates 78 are illustrated in FIGS. 8 and 9 and are designed to simultaneously sever and weld the strip 14 transversely across its width between the spaced apart edges 24 and 25. For this, anvil surface 76 comprises a first surface means 86. The first surface means includes a knife edge 88 extending transversely to the path of travel of the strip 14 for serving the material interposed between the knife edge 88 and the forward end 68 of the horn 66 which is longitudinally vibrating at an ultrasonic rate, as illustrated by doubled headed arrow 90.

The knife edge 88 is inclined outwardly into bevelled surfaces 92 that are designed to simultaneously weld or fuse the overlapping layers of material 34 through 42, inclusive, that are engaged. Accordingly, the knife edge 88 and bevelled sections 92 provide a comparatively narrow path responsive to the ultrasonic energy applied to the horn 66.

For aesthetic purposes, as well as for strength, the individual spot welds 48 are formed by second surface means 94 adjacent each side of the first surface means 86. The second surface means 94 include a longitudinal row of bosses 95. The bosses 95 act in conjunction with the knife edge 88 which, however, extends farther than the bosses 95 for the cutting operation. In this manner the trailing edge 27 of one article and the leading edge 26 of the next article are formed with each reciprocation of the equipment.

It is to be appreciated that the shape, size and contour of the first surface means 86 and the second surface means 94 may be varied to obtain the desired end result. In FIG. 8 the forward end 96 of the cutting edge 88 is contoured to obtain a rounded forward end 45 on the individual tape 12. In addition, the cutting edge 88 extends beyond the last boss 95 so as not to produce the individual spot welds 48 across the entire width of the individual tabs 22, as illustrated in FIG. 5.

Returning to FIGS. 1 and 2, the reciprocating means 82 comprise a double acting cylinder 100 vertically mounted as by bracket 102 to the front surface 58 of mounting plate 55 and a longitudinally extending shaft 104. The shaft is connected by linkage means 105 to the upper end 74 of anvil 18. The linkage means 105 includes a bracket 106 secured to the anvil top end 74 as by fasteners 108 and a shaft extension member 110 connected by a transversely extending pin 112 to the bracket 106. This permits a certain degree of freedom of motion during the reciprocation of the anvil 18 in the direction transverse of double headed arrow 85.

The reciprocating means 82 also comprise guide means 115 that include a guide plate 116 secured to the mouting plate 55 on the front surface 58. In operative relationship to the guide plate 116 is a guide member 118 which may have a complementary interlocking arrangement with the guide plate 116. The guide member 118 is coupled to the anvil 18 for reciprocation therewith between the operative position and open position of the tool 16 and anvil means 18.

The double acting cylinder 100 may be in the form of a fluid activated piston, well known in the art, in order to obtain the necessary movement of the anvil means 18 in timed relationship to the movement of the strip 14 on an intermittent basis. The continuous strip 14 is provided on roll 15 mounted rearwardly of the reciprocating means 82 on a support unit 120 that extends from the surface 52 of the frame 50 and a transversely extending support shaft 122 on the support unit 120 to permit freedom of rotation of one or two rolls 15.

To intermittently advance the strip 14 from roll 15, feeding means 125 is provided. The feeding means 125 intermittently advances the leading end of the strip 14 a predetermined distance by means of the elements 30 contained thereon, as illustrated in FIG. 3. The feeding means 125 is movable from a retracted position to an extended position in timed relationship to the reciprocating means 82.

Simultaneously with the operation of the feeding means 125, interposing meas 130 progressively interposes a continuous strip of insulation element 132 from a roll 134 between the taps 22 as the strip 14 is advanced. The insulation element 132 is characterized in that while separating the tabs 22 physically from each other, it simultaneously maintains the tabs 22 in acoustical energy coupling relationship to each other in the operative position of the reciprocating means 82.

This permits the individual layers of material in each of the respective tabs 22 to be welded to each other. Specifically, the layers of materials 41 and 42 are welded to each other in one tab and layers 32, 35, 36, and 40 are welded to each other in the other tab 22. At the same time the insulation element 132 prevents the adjacent overlapping layers 40 and 41 of different tabs 22 from welding to each other. For this, the insulation element 132 may be of a paper or plastic material also characterized in that it does not bond to the layers of material from which the tabs 22 are produced. A suitable plastic material has been found to be Teflon and, paper, one that is waxed, or otherwise coated to avoid bonding to the material.

The thickness of the insulation element 132 is selected to be easily severed from the roll that it is supplied on. As illustrated in FIG. 4, the severed insulation element 132 is thereafter readily removable from its positionment between the tabs 22. In operation the severed individual tapes 12 fall down a chute 133 provided beneath the horns 66 and into a bin 135 in which they are accumulated.

In view of the fact that the elements 30 vary as to their longitudinal spacing, the feeding means 125 has been designed to advance the strip each time based upon a particular number of elements 30. This is accomplished when the horn 66 is ultrasonically vibrating and the work station comprised of the anvil means 18 and horn 66 are in their open position to permit feeding the strip a discrete amount therebetween.

The feeding means 125 is comprised of engaging means 136 pivotably movable into contact with one of the elements 30 on the strip 14 when advancing same and over the elements 30 when moved from the extended position designated for convenience by numeral 138 to a retracted position identified by numeral 140. The feeding means 125 includes a double acting air or hydraulic activating unit 142 that is pivotally secured at one end 144 to a clip 146 mounted on the back end 60 of mounting plate 55. The opposite end of the activating unit 142 has a piston rod 148 extending outwardly therefrom and coupled to a pivot arm or member 150. The pivot arm 150 may be partially within a housing 152 that is also mounted on the rear surface 60 of the mounting plate 55. To permit the angular pivotal movement of the arm 150 between the respective phantom positions illustrated, a transversely extending shaft 154 is provided between the respective ends 156 and 158 of the arm 150. The shaft 154 permits the arm 150 to move with the movement of the rod 148 of the activating unit 142.

The linear travel of the engaging means 136 is related to the angular movement of the arm 150. To regulate the linear travel of the engaging means 136, limit means 160 is provided in the form of a pair of spaced apart stops 168 having inclined sides 162 mounted on a rear plate 164 of housing 152 having an opening 166 therein through which the arm 150 extends.

The arm 150 is rigidly coupled to a feeding member 170 extending downwardly therefrom. Two engaging means 136 are utilized for a dual production line, as illustrated in FIG. 1. Each of the engaging means 136 is mounted for free pivotal movement at the lower end 172 of the feeding member 170 for movement in an arcuate path illustrated by arrow 174 as the arm 170 moves in the path indicated by doubled headed arrows 175.

The engaging means 136 has housing means 176 pivotally mounted at one end thereof on the feeding member 170 by transversely extending shaft 177. The housing means 176 as illustrated in FIGS. 2 and 7, includes an axially extending opening or groove 178. A finger element 180 is mounted in telescopic relationship to the opening or groove 178 for longitudinal adjustment relative thereto. Securing means 182 is provided in operative relationship with the housing means 176 and finger element 180 for locking them in a releasably fixed position relative to each other. The securing means comprises a fastener having a threaded portion 185 that mates with a complementary threaded portion in the finger element 180 and a fastener head 186 for releasably locking the finger element 180 to the housing means 176. In this manneer, the exact position of the finger element may be selected to initially calibrate the machine.

When the feeding means is operated, it moves forward from the retracted position 140 to the extended position 138. This movement occurs in timed relationship to the reciprocating means 82. Biasing means 192 maintains the front or distal end 190 of the finger element 180 in contacting relationship with an element 30. The biasing means 192 may include a coiled spring 193 mounted at one end 194 to the feeding member 170 and the opposite end 195 to the housing means 176 to obtain a downwardly biasing force in the direction of single headed arrow 174. As the finger element 180 pushes the strip 14 from guide roll 196 along the support surface 52,, the insulation element 132 is simultaneously unwinding from roll 134 and interposed between the tabs 22.

When the engaging means 136 has obtained the position illustrated at 138, its forward movement is stopped by the limit means 160 and the distal end 190 is adjacent to the work station, as illustrated in FIG. 2. Reversing the movement of piston 148 then applies the necessary downward force on arm 150 to swing the feeding member 170 to the retracted position 140. During this movement the engaging means 136, due to the biasing means 192, is free to move above the spatially extending elements 130. When the engaging means reaches the retracted position 140, as illustrated in FIG. 3, the finger 180 extends between two adjacent elements 30.

Figure 10:
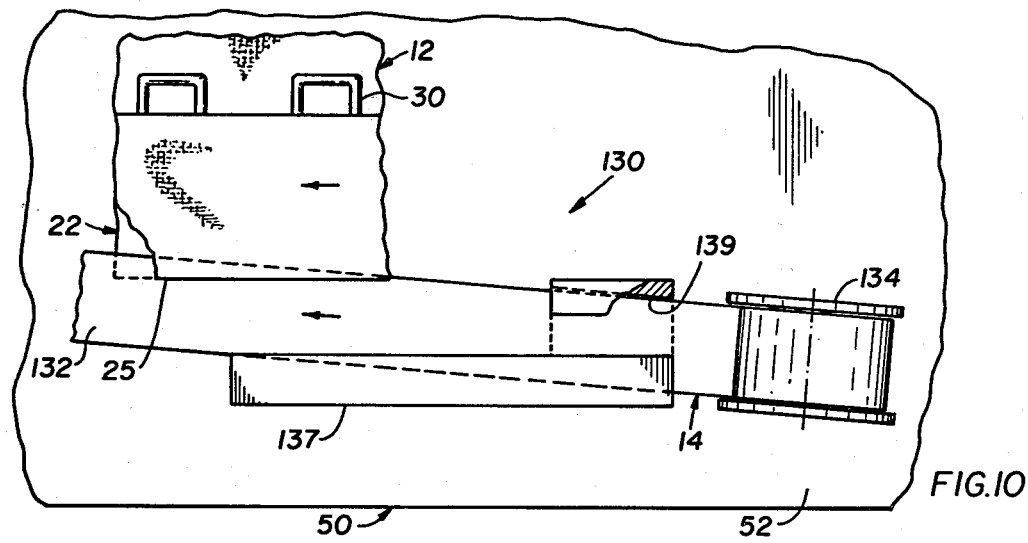
FIG. 10 is an enlarged fragmentary view, partly in section, taken along lines 10—10 of FIG. 2.

The interposing means 130, as illustrated in FIG. 10, may be positioned between the insulation element roll 134 and the guide roll 196 (FIG. 2) to properly insert the insulation element 132 on a continuous basis as the strip 14 is advanced. The interposing means 130 includes an interposing plate 137 mounted on the supporting surface 52 and having a horizontally extending channel or groove 139 and the roll 134 may be angularly disposed to initially insert the insulation element 132 between the tabs 22. A pair of guide rails 151 illustrated in FIG. 1, are provided in spaced relationship to each other adjacent the mounting plate 55 and on the supporting surface 52. The guide rails 151 are in alignment with the horn 66 and provide the final positionment of the insulation element 132 between the tabs 22.

It is appreciated that the interposing means 130 may include a positive drive to advance the insulation element 132 if same is found necessary or desired. The need for a positive drive will in part depend upon the characteristics of the insulation element 132 selected.

The width of the article formed may be varied by adjustment of the limit means 160. The movement of the feeding means 136 from its extended to retracted position takes place when the reciprocating means 82 is in its operative position. The interrelated movement and sequencing of the manufacture of the tapes 12 is accomplished by providing an automatic electrical control system that may be contained within the generator unit 75. The electrical control system provides the signal necessary for activating the reciprocating means 82 and maintaining the anvil means 18 and the horn 66 in operative relationship with each other for a specific period of time. During this period of time the welding and cutting of the tape 14 takes place. Also during this period of time the activating unit 142 is energized such that the piston 148 moves downwardly to return the feeding means 136 to its retracted position 140. This cycling of the apparatus 10 can occur in a predetermined time interval and be adjusted for the width of the tapes to be produced.

After a welding and cutting cycle has been completed, and the feeding means 136 returned to its retracted position 140, the reciprocating means 82 is activated for returning the horn 66 and anvil means 18 to their open position to permit the advancing of the next portion of the strip 14 by the feeding means 136. The feeding means 136 is retracted in the operative position of the reciprocating means 82 so as not to pull the strip 14 rearwardly during this motion.

Figure 11:
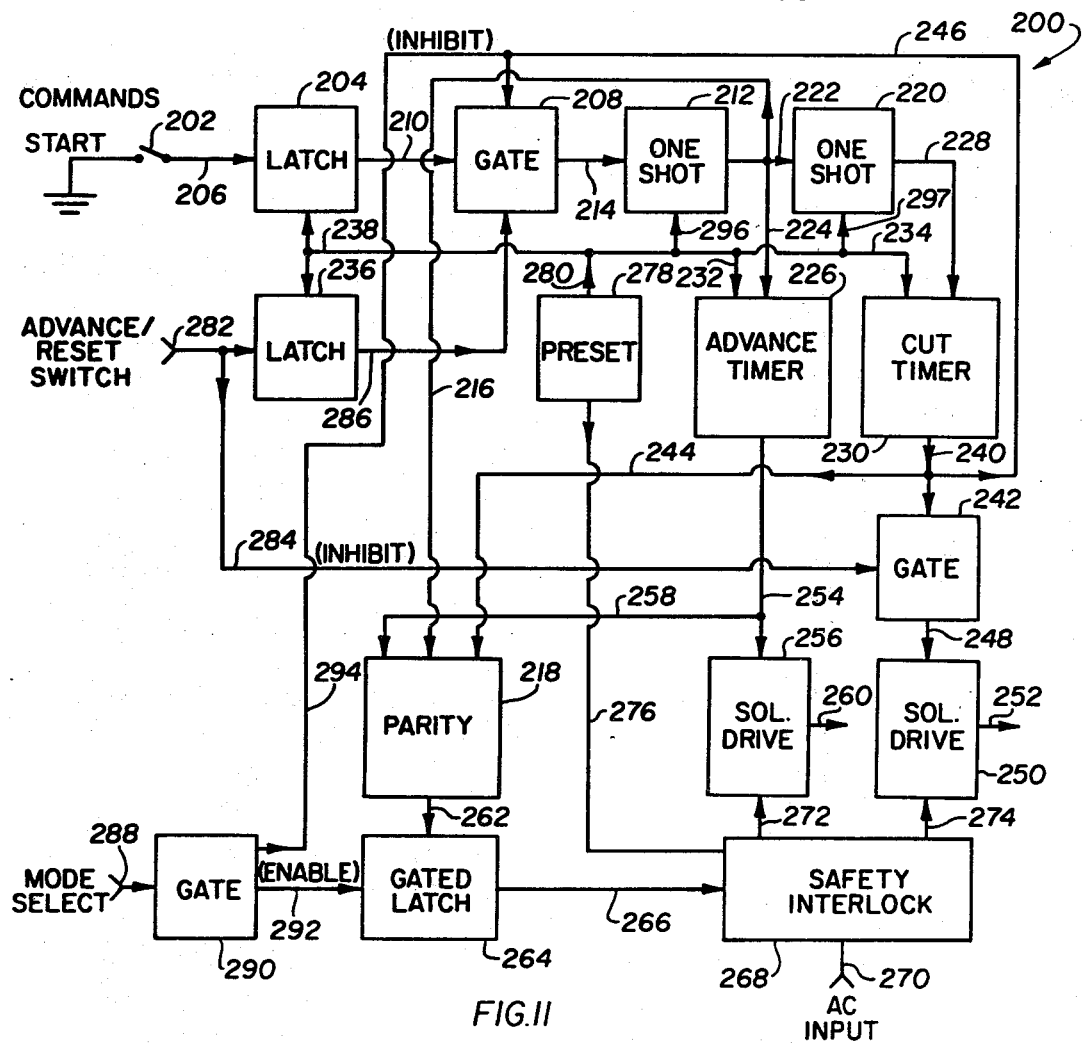
FIG. 11 is a functional block diagram of an automatic electrical control system for operating the apparatus.

Referring now to FIG. 11, there is shown a functional block diagram of a preferred embodiment of an automatic electrical control system 200 which is used to control the operation of the horn 16, the double acting cylinder 100 and the piston unit 142. The control system 200 is powered from a conventional source of 110 volts AC, not shown, and includes conventional solid state modules to perform the required functions. The generator unit 75, which is used to energize the ultrasonic motor 65 and the horn 66, is energized by a separate switch on the generator unit 75 and is kept continually energized during the operation of the apparatus 10.

Start switch 202 is coupled to one input of latch 204 via a lead 206. The output of latch 204 is coupled to one input of gate 208, via lead 210. The output of gate 208 is coupled to the input of one shot multivibrator 212 is coupled via lead 216 to one input of a parity circuit 218, to another one shot multivibrator 220 via lead 222, and via lead 224 to an advance timer 226. One output of one shot multivibrator 220 is coupled via lead 228 to cut timer 230.

The output of cut timer 230 is coupled via lead 240 to gate 242, to parity circuit 218 via lead 244, and via lead 246 to an input of gate 208. The output of gate 242 is coupled via lead 248 to a solenoid driver 250. The output of driver 250 is coupled via lead 252 to a solenoid, not shown, which controls the compressed air line that activates the double acting cylinder 100 which is part of the reciprocating means 82 (FIG. 2).

The output of advance timer 226 is coupled via lead 254 to solenoid driver 256 and via lead 258 to parity circuit 218. The output of solenoid driver 256 is coupled via lead 260 to a solenoid, not shown, which controls the air valve, not shown, that activates piston unit 142 of the feeding means 125 (FIG. 2).

The output of parity circuit 218 is coupled via lead 262 to an input of a gated latch 264. The output of gated latch 264 is coupled via lead 266 to an input of safety interlock 268. The AC input voltage is also coupled via a lead 270 to the safety interlock 268. One output of safety interlock 268 is coupled via lead 272 to an input of the solenoid driver 256, another output of safety interlock 268 is coupled via lead 274 to solenoid driver 250. The output of preset circuit 278 is coupled via lead 280 to lead 238 to preset the latches 204 and 236, to the leads 232 and 234 to preset the advance timer 226 and the cut timer 230, respectively, and to leads 296 and 297 to preset one shots 212 and 220, respectively, and via lead 276 to safety interlock 268.

The input of latch 236 is via lead 282 from an advance reset switch, not shown, which also provides via lead 284 an input of gate 242. The output of latch 236 is coupled via a lead 286 to another input of gate 208. A mode select switch, not shown, is coupled via a lead 288 to control gate 290. One output of control gate 290 is coupled via a lead 292 to another input of gated latch 264 and another, via a lead 294 to lead 246 and an input of gate 208.

In operation the system control is energized by turning on the AC power which also energizes the ultrasonic motor 65 and thus the horn 66; they remain energized throughout the operational advance and cut steps of the system. The system is designed to provide a single cycle or continuous operation, and is capable of generation of all of the required control pulses for continuous operation, and locks the control circuits off if a discrepancy or error in function sequence occurs. The system is also provided with an interrupt button which is capable of immediately stopping the system cycle and resetting it to the initial start conditions.

The system is set to the initial or start conditions (i.e. all solenoids deenergized and all input commands overridden) by means of the preset circuitry 278 including opening the safety interlock 270. When a start pulse is then obtained by closing switch 202, latch 204 turns on gate 208, thereby causing one shot multivibrator 212 to generate an output pulse the trailing edge of which starts the advance timer 226 and triggers one shot multivibrator 220. The trailing edge of the resulting output pulse from multivibrator 220 starts the cut timer 230, the output pulse thereof being processed as follows:

a. If the mode select switch, which is coupled via lead 288 to gate 290, is in the single cycle mode, gate 290 inhibits the output pulse from the cut timer 230 from recycling t the system. The output from gate 290 also removes the enable from the gated latch 264 and the enable pulse was removed. The single cycle is completed when the pulse from the cut timer 230 is processed via gate 242 which energizes the solenoid drive 250.

b. If the mode select switch is in the continuous position, gate 290 enables the gated latch 264 and the parity circuit 218 is activated. The inhibit pulse to the gate 208 is removed and the trailing edge of the pulse from the cut timer 230 retriggers the system.

The parity circuit checks the states of one shot multivibrator 212, advance timer 226 and cut timer 230 against its programmed allowed states. Any dissonance between the allowed states and the signals latches the gated latch 264 which opens the safety interlock 270. The parity circuit 218 can be reset only by removing the AC power.

If only an advance pulse is desired, a pulse may be applied to latch 236 which will provide an output pulse to gate 208, which in turn will trigger one shot multivibrator 212. The only difference between this command and the start command provided by switch 202 is that gate 242 is inhibited, thus preventing the cut solenoid drive circuitry 250 from operating.

Figure 12:
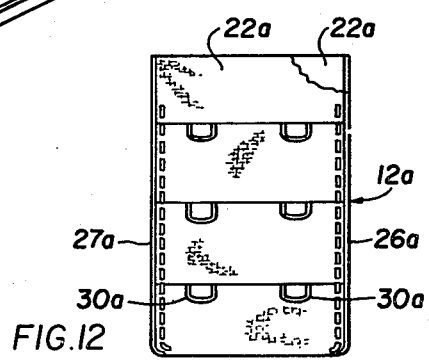
FIG. 12 is a front plan view illustrating a tape having two rows of elements positioned thereon.

As illustrated in FIG. 12, the brassiere tape 12*a* may be formed having two rows of spaced apart elements 30*a* between the respective ends 26*a* and 27*a*. This dimension may be varied by properly adjusting the limit means on the equipment. In this way articles may be formed containing two, three, or four rows of elements.

Although the illustrative embodiment of the invention has been described in detail herein with reference to the accompanying drawings, it is to be understood that the invention is not limited to the precise embodiment and that various changes and modifications may be effected therein without departing from the scope or spirit of the invention.

We claim:

1. The method of fabricating an article from an elongated continuous strip of material formed of flexible layers capable of being ultrasonically welded and having elements longitudinally spaced along an outer one of said layers, said article having a body portion and a pair of overlapping tabs extending therefrom, the method comprising the steps of:

A. interposing between the portion of said layers forming said tabs an insulation element capable of transmitting therethrough ultrasonic vibratory energy for permitting individual layers of material in each of said tabs to be simultaneously welded together, while preventing said tabs from being welded together, B. retaining in an open position a horn and an anvil for receiving the full width of said strip therebetween, said horn having a forward end engaging one side of said strip and said anvil having a surface opposing and cooperating with said forward end and engaging the opposite side of said strip for simultaneously severing and welding said strip across the width thereof when brought into operative relationship with each other, C. advancing said strip between said horn and anvil when in said open position a distance predetermined by the longitudinal space between a selected number of said elements, D. moving said horn and anvil into said operative position in which they engage said opposite sides of said strip and, E. vibrating said horn ultrasonically at least when in said operative position for severing and welding together of the layers of said strip transversely across the entire width thereof while said insulation element prevents said tabs from being welded together, whereby the trailing end of one article and the leading end of the next article are formed.

2. The method as in claim 1, and further including the steps of:

a. providing on said anvil surface a knife edge first surface feature extending transversely to said advancing of said strip for severing said strip and for welding the same along a comparatively narrow path on each side of said severing, and b. providing on said anvil surface a second surface feature adjacent each side of said first surface feature for simultaneously forming a plurality of embossed welds between said layers of said strip on the trailing end of one article and the leading end of the next article.

3. The method as in claim 1, wherein the step of advancing said strip comprises: engaging one of said elements with a feeding means and advancing said feeding means toward said horn and anvil said, distance predetermined by said longitudinal space between said selected number of said elements.

4. The method as in claim 3 wherein said feeding means comprises an arcuately movable arm, and further comprising selecting the number of said elements predetermining said distance of said strip advance by selecting the arc of movement of said arm.

5. The method as in claim 3, and further comprising, after advancing said feeding means, retracting said feeding means said distance without drivingly engaging said elements.

6. The method as in claim 5 wherein said retracting step occurs while said horn and anvil are in said operative position for holding said strip while retracting said feeding means.

7. The method as in claim 5 wherein said feeding means advancing and retracting steps comprise biasing a finger of said feeding means which engages said element at one end against said strip for pushing said element while advancing and riding over said elements while retracting.

8. The method as in claim 7 wherein said elements are on a top layer of said strip, said finger is above said strip, and said biasing comprises pivotally supporting said finger at a point remote from said element-engaging end and at an acute angle to said strip in said retracting direction.

9. The method as in claims 7 wherein said biasing is resilient.

10. The method as in claim 1 wherein said insulation element comprises a continuous sheet and wherein said interposing step comprises interposing said continuous sheet insulation element before advancing said strip for advancing said continuous sheet insulation element with said strip advancing.

11. The method as in claim 1 wherein said forward end of said horn is generally in spaced alignment with said one side of said strip before said strip is advanced, and further comprising vibrating said horn ultrasonically during said strip advancing step.

12. The method of fabricating brassiere tapes from an elongated continuous strip of material formed of flexible layers capable of being ultrasonically welded and having opposite width-defining edges, one for terminating in a pair of overlapping tabs and a plurality of elements longitudinally spaced along an outer one of said layers of said strip between said edges, the method comprising the steps of:
   A. interposing between said tabs an insulation element capable of being readily severed and transmitting therethrough ultrasonic vibratory energy for permitting individual layers of material in each of said tabs to be simultaneously welded together, while preventing said tabs from being welded together,
   B. positioning said strip between ultrasonic welding means comprising a horn for vibrating at an ultrasonic rate with a forward end for engaging one side of said strip, and anvil means having a surface for opposing and cooperating with said forward end for engaging the opposite side of said strip when said horn and anvil means are in an operative position, said horn and said anvil means being further adapted to simultaneously sever and weld said strip transversely across the entire width of said strip between said edges when brought into said operative position,
   C. effecting relative movement by reciprocating means between said anvil means and said horn from an open position in which said anvil means and said horn are spaced apart for said positioning of said strip therebetween to said operative position in which said surface of said anvil means and said forward end of said horn are moved together for engaging said strip on opposite sides thereof as said horn in said operative position is ultrasonically vibrated to effect said severing and welding together of said layers of said strip transversely across the entire width thereof between said edges while preventing said tabs from being welded together with said insulation element, whereby the trailing end of one tape and the leading end of another tape are formed,
   D. advancing the leading end of said strip a predetermined distance by means of one of said elements and feeding means movable from a retracted to an extended position intermittently in timed relationship to said reciprocating means,
   E. retracting said feeding means from said extended position to said retracted position for subsequently again advancing said strip in said timed relationship to said reciprocating means for forming said tape, and
   F. controlling the length of linear travel of said feeding means during said advancing and retracting thereof relative to the number of said longitudinally spaced elements advanced during each reciprocation of said feeding means.

13. The method as in claim 12, wherein said step of effecting relative movement includes the steps of:
   a. maintaining said horn stationary, and
   b. moving said anvil means toward and away from said horn in timed relationship with said advancing intermittently of said strip.

14. The method as in claim 13, and further including the step of vibrating said horn as said strip is advancing relative thereto.

15. The method as in claim 12, wherein said step of effecting relative movement is performed as said horn is vibrating.

16. The method as in claim 12, wherein said advancing of said strip by said feeding means is based on a predetermined number of said elements which determines the width of said tape to be severed from said strip.

17. The method as in claim 12, wherein said retracting of said feeding means to the retracted position occurs when said horn and anvil means are in said operative position.

18. The method as in claim 12, and further including the step of supporting a roll of said strip for continuously advancing the same by said feeding means.

19. The method as in claim 18, and further including the step of mounting a roll of said insulation element adjacent said roll of said strip for said interposing between said tabs as said strip is advancing intermittently by said feeding means.

20. The method as in claim 12, wherein said step of advancing said strip by said feeding means comprises the steps of:
   a. engaging one of said elements on said strip when advancing the same by said feeding means,
   b. urging said feeding means into said engaging relationship, and
   c. permitting pivotal movement away from said elements of said feeding means when moved from said extended position to said retracted position.

21. The method as in claim 12, and further including the steps of:
   a. providing a first surface on said anvil for engaging the layers of material to be welded and severed between said edges, said first surface being formed with a knife edge extending transversely to the path of travel of said strip for compressing and sealing material interposed between said first surface and said horn along a comparatively narrow path responsive to the ultrasonic energy applied to said horn, said knife edge cutting through said tabs and said insulation element extending therebetween, and
   b. providing a second surface adjacent said first surface on said side thereof for simultaneously forming a plurality of embossed welds between the layers of material of said strip on said trailing end of said one tape and said leading end of said other tape.

22. The method as in claim 21, wherein said first surface extends beyond said second surface.

23. The method as in claim 12, wherein said insulation element is produced from a plastic or paper characterized in that it does not bond to said layers of material.

24. The method as in claim 23, wherein said plastic is Teflon.

25. The method as in claim 12, and further comprising the steps of:

a. maintaining said horn and anvil means in said operative position for a specific period of time, and
b. positioning said feeding means in its said retracted position during said period of time said horn and anvil means is maintained in said operative position.

* * * * *